July 9, 1940.                M. FLEISCHMANN                2,207,289
                           FERROUS BEARING MEMBER
                             Filed Jan. 9, 1937

WITNESSES
A B Wallace
Fulton B. Flick

INVENTOR.
Martin Fleischmann
BY Brown, Critchlow & Flick
his ATTORNEYS.

Patented July 9, 1940

2,207,289

UNITED STATES PATENT OFFICE 2,207,289

FERROUS BEARING MEMBER

Martin Fleischmann, Canton, Ohio, assignor to The Timken Roller Bearing Company, Canton, Ohio, a corporation of Ohio Application January 9, 1937, Serial No. 119,830

19 Claims. (Cl. 148—21.5)

This invention relates to steel bearing members.

The term "steel bearing members" is used herein in the broad sense to refer to steel parts which move in contact with one another, or with another part. Thus it includes any steel part which moves in contact with another member under conditions necessitating the use of a lubricant. The term includes, therefore, not only such articles as cylinder liners, wrist pins, moving valve parts, crank shafts, gears, and other similar members which move relative to another member in contact therewith, but also worm drives, gears, and other similar elements which are subjected to high unit pressures, including bearing members in the more narrow sense, particularly roller bearings.

A major object of the invention is to provide articles of the type referred to, especially articles adapted to be operated under high pressures, which possess surface characteristics that are especially desirable in such articles, which may be produced from steels commonly used to supply the mechanical properties desired in the article for its particular use, and which may be produced easily, without undue cost burdens, and with standard equipment available and commonly used in the industry. Other objects will appear from the following specification.

Figure 1:
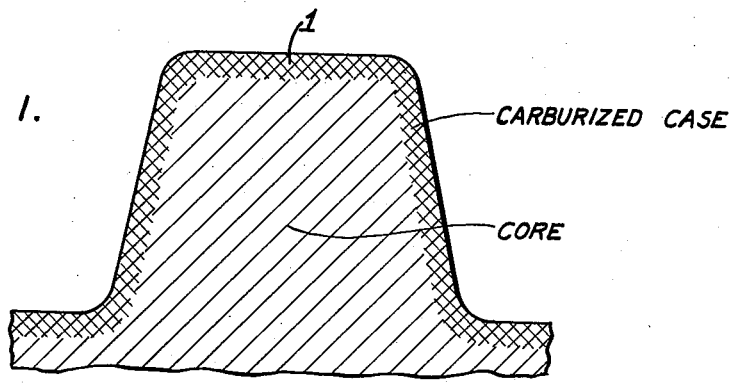
Figure 2:
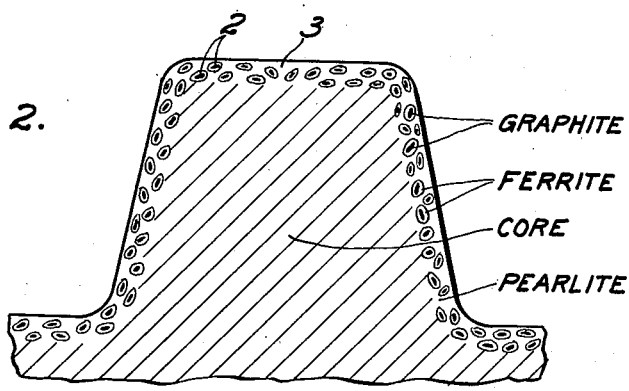
Figure 3:
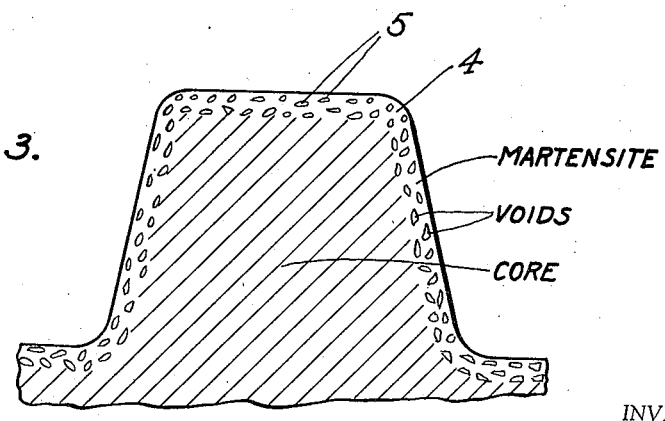

The invention will be described with reference to the accompanying drawing in which Fig. 1 is a section through a gear tooth representing schematically a stage in the production of a gear in accordance with the invention; Fig. 2 a view similar to Fig. 1 showing schematically the structure produced in one embodiment or step of the invention; and Fig. 3 a view similar to Fig. 2 representing the structure characteristic of another embodiment or later step of the invention.

In accordance with the invention steel bearing members are formed from steel adapted to provide the mechanical properties needed for their intended use. The article is then carburized to enrich its marginal layers in carbon, following which a substantial proportion of the carbon in the case is converted to the graphitic state. The resultant article consists essentially of and possesses the mechanical properties characteristic of the steel from which it was made; however, it differs from ordinary steel articles in that graphite is distributed throughout the marginal layers of the metal, i. e., in the carburized layer.

Such articles, having graphitic carbon distributed through their marginal layers, may be applied to various uses. However, for many purposes it is preferred to convert them into a form combining an unique combination of properties. This is accomplished, in accordance with the invention, by heat treating the article to cause graphitic carbon to be redissolved, with retention of the solution, whereby the spaces initially occupied by the graphite remain as voids, thus conferring unusual and highly desirable surface characteristics in combination with the mechanical properties normally capable of development in the particular steel, as will be pointed out more fully hereinafter.

To effect graphitization of the carburized case it is necessary to have present in the steel an amount of a graphitizing agent sufficient to cause decomposition of the iron carbide in the case with precipitation of graphite when the article is heat treated after the case has been formed. Silicon is probably the best known graphitizing agent. I have found, however, that silicon alone in the amounts normal to steels adapted for the manufacture of worm drives, gears, anti-friction bearings, and other bearing members of the type contemplated herein, may not afford entirely satisfactory graphitization. On the other hand, if the silicon content of the steel is increased the tendency is to interfere with carburization. Thus, in the carburization of a steel used for making dynamic members and containing from about 1 to 1.5 per cent of silicon there is ordinarily obtained only a shallow layer of graphite at the base of the case, i. e., inwardly from the surface, where the graphite is not effective for the purposes of the invention. The presence of high silicon in these steels apparently causes or enhances surface decarburization, and in consequence of the loss of carbon from the suface layer during cooling, the formation of graphite is thus prevented in the region of the surface, and the result is that the graphitic carbon lies well below the surface, where it does no good.

However, a number of other graphitizing agents are known, including, for example, nickel, aluminum, and molybdenum. For most purposes, therefore, it is preferred to supplement the action of the silicon normally present in the steel by that of an additional graphitizing agent. Such graphitizing agents may be supplied through the normal composition of the steel to be used for making a part. For instance, the parts may be made from nickel-molybdenum steels such, for example, as one which contains from about 0.1 to 0.2 per cent of carbon, from about 0.5 to 5.0 per cent of nickel, and from about 0.1 to 1 per cent of molybdenum. Such a steel thus naturally contains both nickel and molybdenum, both powerful graphitizing agents. In view of the content of nickel and molybdenum, the silicon content may be as low as 0.2 per cent. Although aluminum, like silicon, may tend to interfere with carburization, for which reason rather small amounts may be desired, say from about 0.02 to 1 per cent, more aluminum may be used in special instances, say up to 6 per cent.

It has been found that boron is not only a powerful graphitizing agent, but also that it embodies properties rendering it peculiarly adapted to the practice of this invention. Chief among these are the facts that boron apparently represses surface decarburization during cooling after carburization, and that it causes the graphitic carbon to be precipitated throughout the extent of the case within which it is formed. Thus boron overcomes the disadvantages which characterize silicon.

The amount of boron to be used will depend in part upon the result sought to be obtained and the steel analysis used. Thus, as little as 0.01 per cent of boron suffices to inhibit decarburization. For instance, articles made from a steel containing 0.01 per cent of boron when carburized, cooled, and hardened are full hard at the surface. Articles made in the same manner and from the same steel, except for lacking the boron, will exhibit a soft skin after treatment.

Where it is desired to take advantage of the void structure described more in detail hereinafter, the article should contain about 0.02 to 0.03 per cent of boron to provide adequate graphitization for subsequent formation of the voids. Generally speaking, the boron content should not exceed about 0.5 per cent, suitably about 0.25 per cent, although for some purposes greater amounts might be used.

The contents of boron stated refer to the amount of boron added to the steel, as in the form of ferro-boron. Of course, some amount of the boron is lost, as by oxidation, and since such small amounts of boron are difficult to determine with precision it is more convenient to refer to the amount added to the steel. The limits for boron stated herein and in the claims are accordingly on the basis just stated.

For most purposes rather small amounts of boron suffice for the purposes of this invention. Thus, excellent graphitization of carburized cases may be had with 0.1 per cent of boron. As little as 0.001 per cent of boron in the steel may be effective where there is present another graphitizing agent in an amount such that the two combine to produce graphitization. In the very low ranges of boron it will thus usually be desirable to increase the normal content of, for example, silicon, or to add another graphitizating agent, although this is not necessary where the boron is used chiefly to avoid decarburization.

Graphitization with boron is accomplished most satisfactorily by bringing the article to a high temperature, say 1600° to 1800° F. But as indicated hereinafter, the best results are had by slow cooling following carburizing.

The invention is applicable generally to steels used for making bearing members contemplated herein. However, it is applicable with the best results to the so-called carburizing steels, which term as commonly used has reference to steels which generally do not contain more than about 0.25 per cent of carbon. In order to provide sufficient graphite in the marginal layers, the case should contain a high concentration of carbon prior to being graphitized, e. g., carbon in excess of the eutectoid composition. For the best results it is preferred to so conduct the carburizing as to produce a case containing at least about 1.1 per cent of carbon. Such a case contains sufficient carbon to permit the formation of graphite in amounts sufficient to confer desired anti-friction properties in the marginal layers of the finished article. To this end the carburization should be effected by a medium which assures the production of a high concentration of the carbon in the case, and at the same time the carburizing should be controlled to avoid the formation of a coke deposit on the surface of the article because such deposits generally act to impede carbon diffusion into the article. Generally speaking, gas carburization is particularly suitable for these purposes.

In the practice of the invention the article, such, for example but not by way of limitation, as a gear, is formed and it is then carburized to form a case I, Fig. 1. The carburization may be conducted according to procedures well known in the art, for which reason the details need not be delineated here. As indicated, however, care should be taken to attain a high concentration of carbon in the case. Most suitably the article is slowly cooled in the carburizing container to a temperature well below the critical range, say to 900° F. The exact rate of cooling will depend upon circumstances; in general, however, the more slowly the article is cooled the coarser the graphitic carbon particles will be, and the greater the amount of graphite. The article might be quenched, as by cooling in air, after carburization, and subsequently graphitized by heating above the critical temperature, but since the article must be reheated to temperatures above the critical range to cause graphitization, this procedure is usually less desirable because decarburization may occur unless precautions are taken to heat in an atmosphere in equilibrium with the steel, which is procedurally and economically not desirable.

After graphitization the article possesses a structure at and adjacent the surface such as shown schematically in Fig. 2, there being distributed throughout the marginal layers of the article, to a depth corresponding to that of the original hypereutectoid case, particles of graphite 2 in a matrix 3 of ferrite or pearlite. In many instances the graphitization will carry the combined carbon content of the cased region to the hypoeutectoid composition, which explains why the graphite may appear in a ferritic matrix.

Except for the thin cased and subsequently graphitized layer at the surface, the article consists of the steel from which it was made so that the achievement of desired mechanical properties is thus not affected by the treatment applied in the practice of the invention.

There is thus provided an article whose general mechanical properties are those of the steel from which it is formed so that the article may be produced for any particular use. While such articles are useful in themselves for some purposes, because the marginal layers of the article contain graphite, it is now preferred to subject the article to a further heat treatment, as indicated hereinabove, in which the graphitic carbon, or a substantial proportion thereof, is redissolved in the matrix, usually austenite, thereby creating voids at the places theretofore occupied by the graphitic carbon. Such heat treatment of the article may, and usually will, be effected in such manner as to confer upon the core the structure productive of the properties desired in the final product, such heat-treating practice being known in the art. The article is then quenched rapidly so that the carbon will remain in solution. The article now comprises a body, or core, with the metallographic structure due to the heat treatment. The marginal layers, to the depth of the original case, comprise martensite 4, or other structural constituent produced by heat treatment, interspersed with microscopically fine voids 5, Fig. 3.

An advantage of this embodiment of the invention is, as contrasted with that in which graphite is present, that through such solution of graphite with retention of the resultant martensite or other carbide constituent, high surface hardness may be obtained, thus providing a combination of high wear-resistance and satisfactory surface qualities now to be described in detail. For example, using SAE 4620 steel, surface hardness values as high as 63 to 65 on the Rockwell C scale may be obtained easily by reheating and oil-quenching after carburizing.

The voids in the marginal layers of the article provide an unusual and highly desirable combination of properties. More particularly, the voids confer surface properties of major engineering importance. It has been found, for example, that such a structure permits the safe sustenance of much higher loads with a given lubricant than a steel of similar composition which lacks the voids in its marginal layers, or a steel of different composition but of the same hardness. In other words, the article may be loaded more heavily with a given lubricant, without damage, than the same elements which lack voids in their marginal layers.

The exact reason for this result is not known with certainty. However, it appears probable that the voids act as reservoirs for lubricant, and their microscopic size combined with surface tension, and perhaps other phenomena, cooperate to lock, or anchor, the lubricant film on the surface, thus impeding breakdown of the oil film until pressures are reached materially in excess of those at which damage would occur to the part.

That this is not the complete explanation appears from the fact that parts, such as gears, produced according to the invention, run in much more quickly, e. g., twice as fast, as the same parts made according to prior practice. Similarly, such elements as bearings more quickly adapt themselves to minor misalignments In all such instances a greater contact, or bearing, area is established in less time than with members constructed according to practice heretofore, which is of particular advantage for the reasons that, among others, the efficiency of the machine is increased, or the normal efficiency attained more rapidly, and the noise incident to operation of a new machine is decreased more rapidly.

A further advantage of the ability to carry greater loads is that bearing parts may safely be made smaller than heretofore. Thus, there has been no difficulty in most instances in supplying adequate strength, but parts have been made of a given size to provide enough bearing area to maintain a film of lubricant under the normal loads and overloads. But since the practice of the invention increases the safe load that may be applied to an oil film, it will be clear that this property may be applied to reducing the bearing area of contact, and consequently the size of the part, which is of real significance to some branches of industry.

As evidencing the benefits to be derived from the invention, reference may be made to tests made with the Timken wear and lubricant tester. This device is used widely for determining the film strength of lubricants. Essentially, a ring of hardened steel, most suitably a roller bearing cup, is rotated against the test specimen in the form of a block of rectangular section. Lubricant is flowed between them, and the load is increased by a lever beam system until the test specimen becomes scuffed, or scored, which load represents the film strength of the lubricant. Extended experience with this testing machine has shown that with a given rotor and lubricant the film strength is independent of the composition of the test blocks provided they are of the same hardness.

In the tests referred to there was used a steel (A) containing 0.03 per cent of boron, 0.18 per cent of carbon, 0.14 per cent of chromium, 0.49 per cent of manganese, 0.26 per cent of molybdenum, 1.82 per cent of nickel, 0.012 per cent of phosphorus, 0.68 per cent of silicon, and 0.02 per cent of sulfur. There was used also a carburizing steel (B) of standard composition, containing no boron, used as a comparison standard for these tests, which had been carburized and heat treated, using a double quench, to produce the best possible bearing surface.

Samples of steel A were pot carburized at 1725° F., followed by slow cooling, and thereafter they were heated to 1525° F. and quenched in oil after which they were tempered to bring them to the same hardness as the steel B material. The steel A material exhibited numerous voids distributed through the area occupied by the case, while these were lacking in the steel B material.

The test blocks were then tested under the same conditions in the Timken tester, using an oil of SAE 50 viscosity. The steel B material scuffed badly at a beam load of 12 pounds, while steel A did not scuff until the load reached 20 pounds. This demonstrates the greater load-carrying ability of the products made in accordance with this invention; these showed a load-carrying ability 80 per cent greater than attainable with steel B.

According to the provisions of the patent statutes, the principle and mode of applying the invention have been illustrated and described together with what is now considered to represent its best embodiment. However, it is desired to have it understood that, within the scope of the appended claims, the invention may be practiced otherwise than as specifically illustrated and described.

I claim:

1. That method of making steel bearing members which comprises forming an article from steel containing a graphitizing agent in an amount to permit graphitization of a carburized case formed on the article, carburizing the article to form a carburized case, and heat treating the carburized article at an elevated temperature to convert a substantial proportion of the carbon in said case to the graphitic state.

2. That method of making steel bearing members which comprises forming an article from steel containing silicon and another graphitizing agent, the amount of silicon and said other graphitizing agent being such as to permit graphitization of a carburized case formed on the article, carburizing the article at an elevated temperature to form a carburized case thereon, cooling the carburized article, and reheating to a temperature adapted to convert a substantial proportion of the carbon in said case to the graphitic state.

3. That method of making steel bearing members which comprises forming an article from steel containing silicon and another graphitizing agent, the amount of silicon and said other graphitizing agent being such as to permit graphitization of a carburized case formed on the article, carburizing the article at an elevated temperature to form a carburized case thereon, and cooling the thus treated article slowly through the critical range and thereby causing graphitization of said case.

4. That method of making steel bearing members which comprises forming an article from steel containing a graphitizing agent in an amount to permit graphitization of a carburized case formed on the article, carburizing the article to provide a carburized case containing carbon in excess of the eutectoid composition, and heat treating the carburized article at a temperature above the critical range to convert a substantial proportion of the carbon in said case to the graphitic state.

5. That method of making steel bearing members which comprises forming an article from steel containing a plurality of graphitizing agents, carburizing the formed article to provide a carburized case thereon, and heat treating the carburized article at a temperature above the critical range to convert a substantial proportion of the carbon in said case to the graphitic state.

6. That method of making steel bearing members which comprises forming an article from steel containing silicon and an additional graphitizing agent, carburizing the formed article to provide a carburized case, and heat treating the carburized article at a temperature above the critical range to convert a substantial proportion of the carbon in said case to the graphitic state.

7. That method of making steel bearing members which comprises forming an article from steel containing from about 0.001 to 0.5 per cent of boron, carburizing the article to form a carburized case, and heat treating the carburized article at a temperature above the critical range to convert a substantial proportion of the carbon in said case to the graphitic state.

8. That method of making steel bearing members which comprises forming an article from steel containing from about 0.001 to 0.5 per cent of boron, carburizing the article at an elevated temperature to form a carburized case thereon, and cooling slowly through the critical range and thereby causing graphitization of said case.

9. That method of making steel bearing members which comprises forming an article from steel containing from about 0.01 to 0.25 per cent of boron, carburizing the article to provide a carburized case containing carbon in excess of the eutectoid composition, and heat treating the carburized article at a temperature above the critical range to convert a substantial proportion of the carbon in said case to the graphitic state.

10. A method according to claim 9, said case containing at least about 1.1 per cent of carbon.

11. That method of making steel bearing members which comprises forming an article from steel containing silicon and boron in amounts adapted to cause graphitization of a carburized case formed on the article, carburizing the article at an elevated temperature to provide a carburized case, and cooling slowly through the critical range and thereby converting a substantial proportion of the carbon in said case to the graphitic state.

12. A method according to claim 11, said case containing carbon in excess of the eutectoid composition.

13. That method of making steel bearing members which comprises forming an article from steel containing a graphitizing agent, carburizing the formed article, heat treating the article at a temperature above the critical range to cause graphitization of the case with formation of graphitic carbon, then reheating to cause recombination of said graphitic carbon, and quenching the article, and thereby providing an article characterized by the presence of microscopically fine voids in its marginal layers.

14. That method of making steel bearing members which comprises forming an article from steel containing boron between about 0.001 and 0.5 per cent and in an amount to permit graphitization of a carburized case formed on the article, carburizing the formed article, heat treating the carburized article at a temperature above the critical range to cause graphitization of the case with formation of graphitic carbon, then reheating to cause recombination of said graphitic carbon, and quenching the article, and thereby providing an article characterized by the presence of microscopically fine voids in its marginal layers.

15. As a new article of manufacture, a case-carburized steel bearing member the case of which contains a substantial proportion of carbon in the graphitic state.

16. As a new article of manufacture, a case-carburized bearing member formed from steel containing a plurality of graphitizing agents and the case of which contains a substantial proportion of its carbon in the graphitic state.

17. As a new article of manufacture, a case-carburized bearing member formed from steel containing from about 0.001 to 0.5 per cent of boron, a substantial proportion of the carbon in the case being in the graphitic state.

18. As a new article of manufacture, a case-carburized bearing member formed from steel containing a plurality of graphitizing agents including from about 0.001 to 0.5 per cent of boron, a substantial proportion of the carbon in the case being in the graphitic state.

19. As a new article of manufacture, a case-carburized article formed from steel containing silicon and from about 0.01 to 0.25 per cent of boron, a substantial proportion of the carbon in the case being in the graphitic state.

MARTIN FLEISCHMANN.